United States Patent
Firestein et al.

(10) Patent No.: US 10,058,797 B2
(45) Date of Patent: Aug. 28, 2018

(54) CONTACTING ARRANGEMENT

(71) Applicant: BATEMAN ADVANCED TECHNOLOGIES LTD., Yokneam (IL)

(72) Inventors: Mark Firestein, Yokneam Moshava (IL); Oded Lerner, Haifa (IL); Nadav Dobrin, Kfar Yona (IL)

(73) Assignee: TENOVA ADVANCED TECHNOLOGIES, Yokneam (IL)

( * ) Notice: Subject to any disclaimer, the term of this patent is extended or adjusted under 35 U.S.C. 154(b) by 188 days.

(21) Appl. No.: 14/909,518

(22) PCT Filed: Aug. 11, 2014

(86) PCT No.: PCT/IB2014/063856
§ 371 (c)(1),
(2) Date: Feb. 2, 2016

(87) PCT Pub. No.: WO2015/022627
PCT Pub. Date: Feb. 19, 2015

(65) Prior Publication Data
US 2016/0166948 A1    Jun. 16, 2016

(30) Foreign Application Priority Data
Aug. 12, 2013    (GB) .................................. 1314425.8

(51) Int. Cl.
*B01D 11/04* (2006.01)
*B01J 19/32* (2006.01)
*B01F 13/00* (2006.01)

(52) U.S. Cl.
CPC ........ *B01D 11/043* (2013.01); *B01F 13/0074* (2013.01); *B01J 2219/32206* (2013.01)

(58) Field of Classification Search
CPC ....... B01D 11/04; B01D 11/043; B01D 11/02; B01D 21/0042; B01D 21/0045; B01D 21/0048; B01D 21/0039; B01D 21/0069; B01F 13/10; B01F 13/0074; B01F 13/0081; B01F 13/0094; B01J 19/32; B01J 2219/32; B01J 2219/322; B01J 2219/32203; B01J 2219/32206; B01J 2219/32282;
(Continued)

(56) References Cited

U.S. PATENT DOCUMENTS 590,535 A    9/1897    Arbuckle
2,400,962 A *  5/1946    Thompson ........... B01D 11/043
                                                422/256
(Continued)

FOREIGN PATENT DOCUMENTS

| EP | 0541005 A2 | 5/1993 |
| EP | 635293 A2 | 1/1995 |
| GB | 2144052 A | 2/1985 |

OTHER PUBLICATIONS

International Search Report for PCT/IB2014/063856, search report dated Dec. 16, 2014.
(Continued)

*Primary Examiner* — Joseph Drodge
(74) *Attorney, Agent, or Firm* — Marc Van Dyke; Fourth Dimension IP

(57) ABSTRACT

Contacting arrangements adapted to be installed within a liquid-liquid extraction column, and including pairs of disk and doughnut plates.

20 Claims, 10 Drawing Sheets

(58) Field of Classification Search
CPC .............. B01J 2219/326; B01J 2219/33; B01J 2219/3306; F28F 3/00; F28F 3/02; F28F 3/025; F28F 3/027; F28F 3/04; F28F 3/042; F28F 3/046; F28D 1/03; F28D 9/00
USPC .......................... 210/511, 522; 422/256–259
See application file for complete search history.

(56) References Cited

U.S. PATENT DOCUMENTS

| | | | | |
|---|---|---|---|---|
| 5,194,152 | A | * | 3/1993 | Takacs ................. B01D 11/043 196/14.52 |
| 5,393,429 | A | * | 2/1995 | Nakayama ........... B01D 11/043 210/320 |

OTHER PUBLICATIONS

Written Opinion for PCT/IB2014/063856, written opinion dated Dec. 16, 2014.

* cited by examiner

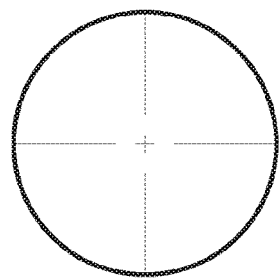
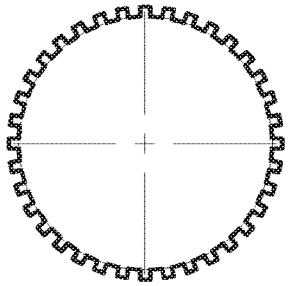
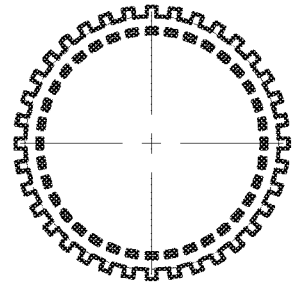
FIG. 5A  
PRIOR ART
FIG. 5B
FIG. 5C
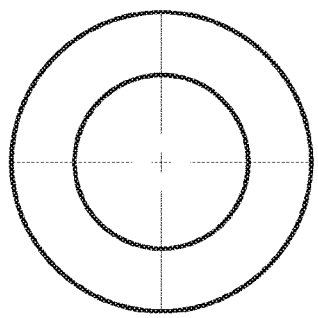
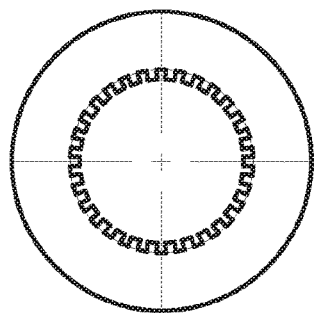
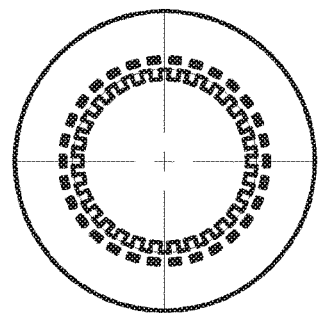
FIG. 5D  
PRIOR ART
FIG. 5E
FIG. 5F Ratio:

1

1.3

2

2.5

3

3

Aqueous Phase          Organic Phase

CONTACTING ARRANGEMENT

This application draws priority from UK Patent Application No. GB1314425.8, filed Aug. 12, 2013, which is incorporated by reference for all purposes as if fully set forth herein.

FIELD AND BACKGROUND OF THE INVENTION

The present invention relates to disk and doughnut contacting arrangements, and, more particularly, to disk and doughnut contacting arrangements suitable for use in pulsed disk and doughnut extraction columns.

In liquid-liquid extraction columns, one liquid may form a continuous phase flowing in one direction along the column and another liquid may form a dispersed phase flowing in the opposite direction. The countercurrent flow is maintained in the equipment by the difference in densities of the liquids and by the force of gravity. Both streams may be pumped through the column at various desired linear velocities.

In many cases, the density difference between the liquids is insufficient to disperse one liquid in the other and to keep turbulence at a requisite level for efficient mass transfer.

Various mechanical stirring or pulsating devices may apply additional energy needed for reaching the desired turbulence. U.S. Pat. No. 2,601,674 to Reman et al., for instance, teaches a rotary disk contactor, while U.S. Pat. No. 4,200,522 to Karr discloses a reciprocating plate column. U.S. Pat. No. 2,011,186 to Van Dijk teaches a pulsed column.

The present inventors have recognized a need for improved disk and doughnut extraction columns.

SUMMARY OF THE INVENTION

According to teachings of the present invention there is provided a liquid-liquid contacting arrangement, adapted to be installed within a liquid-liquid extraction column, the contacting arrangement including: (a) a plurality of pairs of disk and doughnut plates, the pairs stacked in a generally longitudinal stack, the stack being generally perpendicular to broad faces of the disk and doughnut plates, each pair including: (i) a disk plate; and (ii) a doughnut plate, disposed beneath the disk plate; the disk plate having a first liquid-liquid contacting surface along a perimeter of the disk plate; the doughnut plate having a second liquid-liquid contacting surface along an internal perimeter of the doughnut plate; and (b) a securing arrangement adapted to (i) affix the disk plate and the doughnut plate of each pair in a first spaced-apart relationship; and (ii) affix, in a second spaced-apart relationship, the disk and doughnut pairs with respect to one another; at least a portion of the first or second contacting surfaces having teeth disposed in a proximate position to the first and second contacting surfaces, the proximate position defined by:

$$L_{cs\text{-}doughnut} = K \cdot (D_{ext} - D_{int}), \text{ for the doughnut plates;}$$
and $$L_{cs\text{-}disk} = K \cdot (D_{disk}), \text{ for the disk plates,}$$

wherein:

$L_{cs\text{-}doughnut}$ is a maximum distance of the teeth on each particular doughnut plate, from the contacting surface of the particular doughnut plate;

$L_{cs\text{-}disk}$ is a maximum distance of the teeth on each particular disk plate, from the contacting surface of the particular disk plate;

$D_{ext}$ is an outer diameter of the doughnut plate, excluding any protrusions of the teeth;

$D_{int}$ is an inner diameter of the doughnut plate, excluding any protrusions of the teeth;

$D_{disk}$ is a diameter of the disk plate, excluding any protrusions of the teeth, the teeth having an average length of at least 2 mm; and K is a coefficient, K being at most 0.05;

and wherein a length ratio of a perimeter of the teeth to the perimeter, excluding the teeth, is at least 2.0.

According to another aspect of the present invention there is provided a liquid-liquid contacting arrangement, including: (a) a plurality of pairs of disk and doughnut plates, the pairs stacked in a generally longitudinal stack, the stack being generally perpendicular to broad faces of the disk and doughnut plates, at least a particular doughnut plate of the doughnut plates having an outer diameter $D_{ext}$, each pair including: (i) a disk plate; and (ii) a doughnut plate, disposed beneath the disk plate; the disk plate having a first contacting surface along a perimeter of the disk plate; the doughnut plate having a second contacting surface along an internal perimeter of the doughnut plate; (b) a securing arrangement adapted to (i) affix the disk plate and the doughnut plate of each pair in a first spaced-apart relationship; and (ii) affix, in a second spaced-apart relationship, the disk and doughnut pairs with respect to one another; and (c) a column, containing the pairs of disk and doughnut plates, an outer spacing between the particular doughnut plate of the doughnut plates and an inner surface of the column having an area $A_{spacing}$, an inner contacting area of the particular doughnut plate being defined by $\pi \cdot (D_{ext})^2/4$, and an area ratio of the $A_{spacing}$ to the inner contacting area being within a range of 1-5%, 1-4%, 1-3.5%, 1-3%, 1.5-4%, 1.5-3.5%, or 1.5 to 3%.

According to yet another aspect of the present invention there is provided a liquid-liquid contacting arrangement, adapted to be installed within a liquid-liquid extraction column, the contacting arrangement including: (a) a plurality of pairs of disk and doughnut plates, the pairs stacked in a generally longitudinal stack, the stack being generally perpendicular to broad faces of the disk and doughnut plates, each pair including: (i) a disk plate; and (ii) a doughnut plate, disposed beneath the disk plate; the disk plate having a first liquid-liquid contacting surface along a perimeter of the disk plate; the doughnut plate having a second liquid-liquid contacting surface along an internal perimeter of the doughnut plate; and (b) a securing arrangement adapted to (i) affix the disk plate and the doughnut plate of each pair in a first spaced-apart relationship; and (ii) affix, in a second spaced-apart relationship, the disk and doughnut pairs with respect to one another; the disk and doughnut pair having at least one of: at least one disk aperture passing through the disk plate and at least one doughnut aperture passing through the doughnut plate, the aperture area in the disk plate being of a non-uniform radial distribution, such that an innermost area of the disk plate contains at least 60 area %, at least 65 area %, at least 70 area %, at least 75 area %, at least 80 area %, at least 85 area %, at least 90 area %, or at least 95 area % of the disk aperture or apertures, the innermost area being at most 50 area % of the disk plate;

the aperture area in the doughnut plate being of a non-uniform radial distribution, such that an outermost area of the doughnut plate contains at least 60 area %, at least 65 area %, at least 70 area %, at least 75 area %, at least 80 area %, at least 85 area %, at least 90 area %, or at least 95 area % of the doughnut aperture or apertures, the outermost area being at most 50 area % of the doughnut plate.

According to further features in the described preferred embodiments, this innermost area is at most 40 area %, at most 30 area %, at most 25 area %, at most 20 area %, at most 15 area %, at most 12 area %, or at most 10 area % of the disk plate.

According to still further features in the described preferred embodiments, this outermost area of the doughnut plate is at most 40 area %, at most 30 area %, at most 25 area %, at most 20 area %, or at most 15 area % of the doughnut plate.

According to still further features in the described preferred embodiments, the disk aperture is a plurality of disk apertures.

According to still further features in the described preferred embodiments, the doughnut aperture is a plurality of doughnut apertures.

According to still further features in the described preferred embodiments, the disk and doughnut pair has both at least one disk aperture passing through the disk plate and at least one doughnut aperture passing through the doughnut plate.

According to still further features in the described preferred embodiments, at least 20 area %, at least 40 area %, at least 60 area %, at least 80 area %, or at least 95 area % of the doughnut aperture or apertures is disposed radially outside of the disk aperture or apertures. According to still further features in the described preferred embodiments, at least 10 area %, at least 20 area %, at least 40 area %, at least 60 area %, at least 80 area %, or at least 95 area % of the doughnut aperture or apertures is disposed radially outside of the disk plate.

According to still further features in the described preferred embodiments, at least 40 area %, at least 60 area %, at least 70 area %, at least 80 area %, at least 90 area %, or at least 95 area % of the doughnut aperture or apertures is radially disaligned with respect to the aperture area of the disk plate.

According to still further features in the described preferred embodiments, the total area of the one or more apertures on each disk plate is up to 5% of the cross-sectional area of the disk plate.

According to still further features in the described preferred embodiments, the total area of the one or more apertures on each doughnut plate is up to 5% of the cross-sectional area of the doughnut plate.

According to still further features in the described preferred embodiments, the total area of the one or more apertures on each disk plate is within a range of 1-5%, 1.5-5%, 2-5%, or 2-4% of the cross-sectional area of the disk plate.

According to still further features in the described preferred embodiments, the length ratio is at least 2.2, at least 2.4, at least 2.6, at least 2.8, at least 3.0, at least 3.2, or at least 3.5.

According to still further features in the described preferred embodiments, the teeth are disposed on at least one of the doughnut plates.

According to still further features in the described preferred embodiments, the teeth are disposed on at least one of the disk plates.

According to still further features in the described preferred embodiments, the teeth include teeth disposed on both the contacting surface of the doughnut plate and the contacting surface of the disk plate.

According to still further features in the described preferred embodiments, the teeth include teeth disposed on at least one of a top surface of the doughnut plate and a top surface of the disk plate.

According to still further features in the described preferred embodiments, the teeth include teeth disposed on at least one of a bottom surface of the doughnut plate and a bottom surface of the disk plate.

According to still further features in the described preferred embodiments, a first disk plate and a first doughnut plate of a particular pair of the plates are longitudinally separated by a distance $L_{pair}$, at least a portion of the teeth having a length of at least $0.03 \cdot L_{pair}$.

According to still further features in the described preferred embodiments, the average length of the teeth is at least $0.03 \cdot L_{pair}$.

According to still further features in the described preferred embodiments, the average length of the teeth is at least $0.035 \cdot L_{pair}$, at least $0.040 \cdot L_{pair}$, at least $0.045 \cdot L_{pair}$, or at least $0.050 \cdot L_{pair}$.

According to still further features in the described preferred embodiments, the average length of the teeth is at most $0.09 \cdot L_{pair}$, at most $0.08 \cdot L_{pair}$, at most $0.07 \cdot L_{pair}$, or at most $0.06 \cdot L_{pair}$.

According to still further features in the described preferred embodiments, the average length of the teeth is at least 3 mm, at least 4 mm, at least 5 mm, at least 6 mm, at least 8 mm, or at least 10 mm.

According to still further features in the described preferred embodiments, the average length is at least $0.025 \cdot D_{ext}$, at least $0.030 \cdot D_{ext}$, or at least $0.035 \cdot D_{ext}$.

According to still further features in the described preferred embodiments, the average length is at most at least $0.08 \cdot D_{ext}$, at least $0.06 \cdot D_{ext}$, or at least $0.05 \cdot D_{ext}$.

According to still further features in the described preferred embodiments, a spacing between the teeth is at least 3 mm, at least 3.5 mm, at least 4 mm, at least 5 mm, or at least 6 mm.

According to still further features in the described preferred embodiments, the contacting arrangement further includes the column.

According to still further features in the described preferred embodiments, the contacting arrangement further includes a pulsation mechanism, the pulsation mechanism fluidly communicating with an internal volume of the column.

According to still further features in the described preferred embodiments, at least a particular doughnut plate further includes teeth disposed radially outward with respect to $D_{ext}$, between the particular doughnut plate and an internal surface of the column.

According to still further features in the described preferred embodiments, an outer spacing between a particular doughnut plate of the doughnut plates and an inner surface of the column has an area $A_{spacing}$, an inner contacting area of the particular doughnut plate is defined by $\pi \cdot (D_{ext})^2/4$, and an area ratio of $A_{spacing}$ to the inner contacting area is within a range of 1-5%, 1-4%, 1-3.5%, 1-3%, 1.5-4%, 1.5-3.5%, or 1.5 to 3%.

According to still further features in the described preferred embodiments, the securing arrangement includes tie rods passing through the pairs of plates.

According to still further features in the described preferred embodiments, the securing arrangement includes spacer sleeves disposed between the pairs of plates.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 5A is a top view of a prior art disk;

FIG. 5B is a top view of a disk in FIG. 3, having teeth on the perimeter, according to one embodiment of the present invention;

FIG. 5C is a top view of a disk in FIG. 4C, having teeth on the perimeter and additional teeth angled upwards, according to one embodiment of the present invention;

FIG. 5D is a top view of a prior art doughnut;

FIG. 5E is a top view of a doughnut in FIG. 3, having teeth on its inner circumference, according to one embodiment of the present invention;

FIG. 5F is a top view of a doughnut in FIG. 4C, having teeth on its inner circumference and additional teeth angled upwards, according to one embodiment of the present invention;

DESCRIPTION OF THE PREFERRED EMBODIMENTS

Figure 1A:
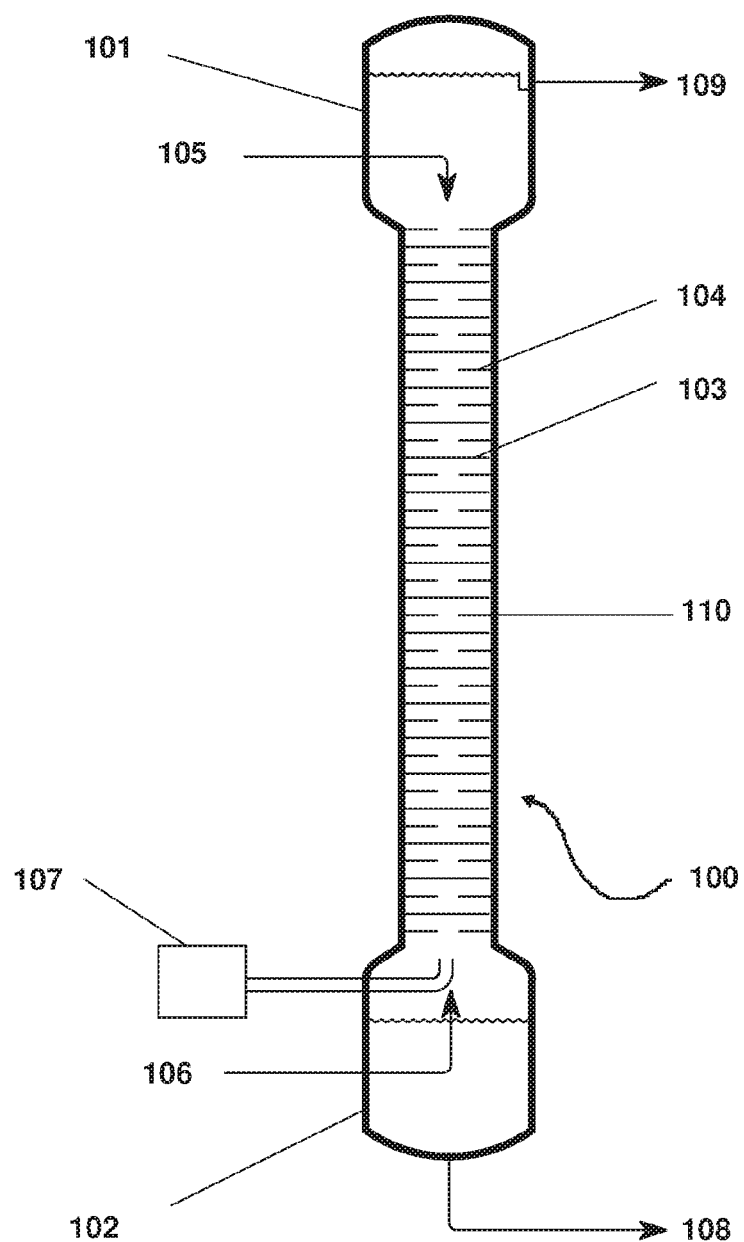
FIG. 1A is a simplified schematic cross-sectional view of a prior art liquid-liquid extraction column containing a disk and doughnut contacting arrangement.

The principles and operation of the disk and doughnut extraction column according to some embodiments of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1A shows a prior art disk and doughnut pulsed column system 100. Pulsed column system 100 includes a column 110 (typically vertical), having an upper decanter 101 at the upper end and a lower decanter 102 at the lower end. The column contains a contacting arrangement including a plurality of pairs of disk plates 103 and doughnut plates 104, the pairs being stacked in a generally longitudinal stack, generally perpendicular to broad faces of the disk and doughnut plates (as better viewed in FIG. 1B). A heavy phase stream 105, usually an aqueous solution, is introduced near the top of the column, and a (relatively) light phase stream 106, usually an organic solvent, is introduced near the base of column 110. A pulsating mechanism 107, which is fluidly connected with column 110, is adapted to periodically raise and lower the liquid level and thereby add turbulence to enhance dispersion and mass transfer between the phases. After passing through column 110, heavy phase stream 105 exits near the bottom of lower decanter 102 as a lower effluent (e.g., raffinate or aqueous outlet) 108. The upper effluent (e.g., solvent outlet) 109 exits near the top of upper decanter 101, and may undergo further processing. Mass transfer of solute from the aqueous phase to the solvent phase, or from the solvent phase to the aqueous phase, may occur, depending on the particular application (e.g., extraction, back-extraction, scrubbing).

Figure 1B:
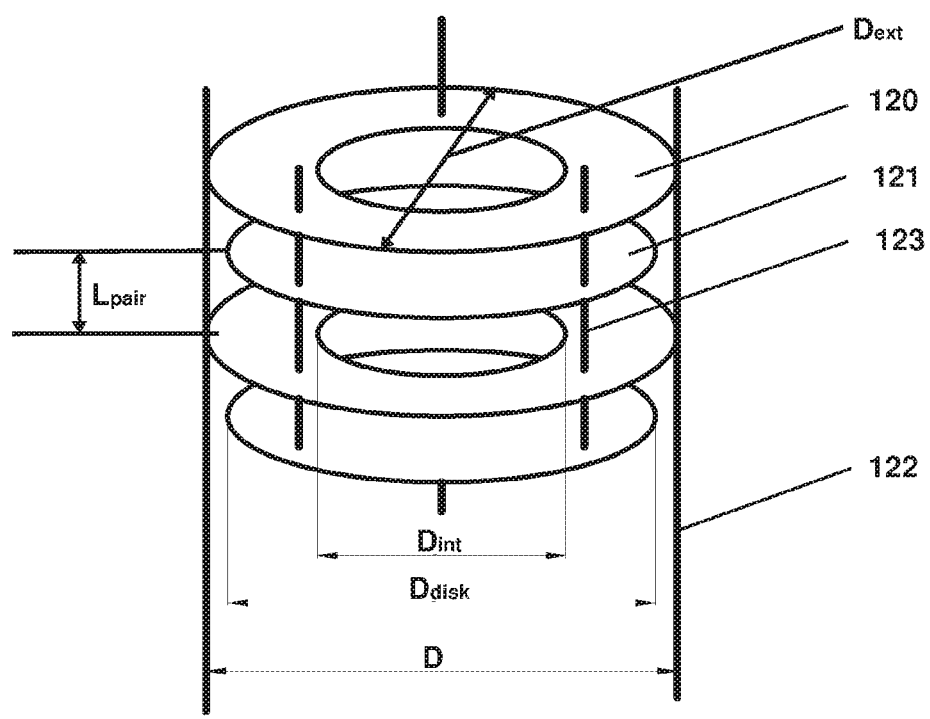
FIG. 1B is a schematic perspective view of disk and doughnut pairs within a column according to the prior art.

FIG. 1B shows a prior art arrangement of disk plates 120 and doughnut 121 plates disposed within a column 122. In this configuration, an outer edge of the doughnut plate 121 is placed as close as possible to (and typically touching) an internal surface of column 122. The plates are linked with continuous vertical tie-rods 123 covered with spacers (not shown) disposed between the plates.

Figure 2A:
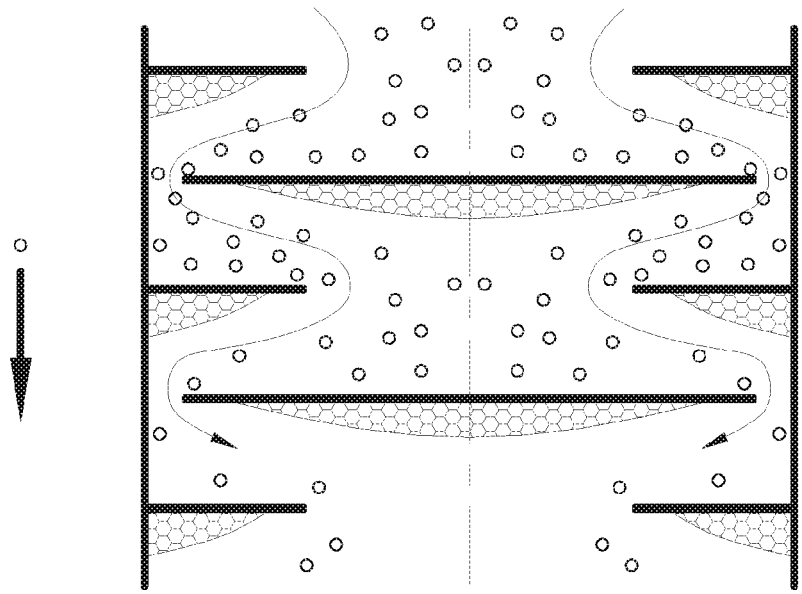
FIG. 2A is a schematic cross-sectional view of a prior art disk and doughnut column showing simulated flow and non-agitated zones when the heavy phase is dispersed.

In pulsed disk and doughnut columns, especially in large-diameter columns, non-agitated areas exist in various parts of the contacting volume. FIG. 2A is a schematic cross-sectional view of a prior art disk and doughnut column showing simulated flow and non-agitated zones when the heavy phase is dispersed. When the continuous phase is the light phase, the heavy phase is dispersed and the heavy droplets pass down through the column. In this mode, there exist non-agitated zones below the center of the disk plates and below the doughnut plates near the inner surface of the column wall.

Figure 2B:
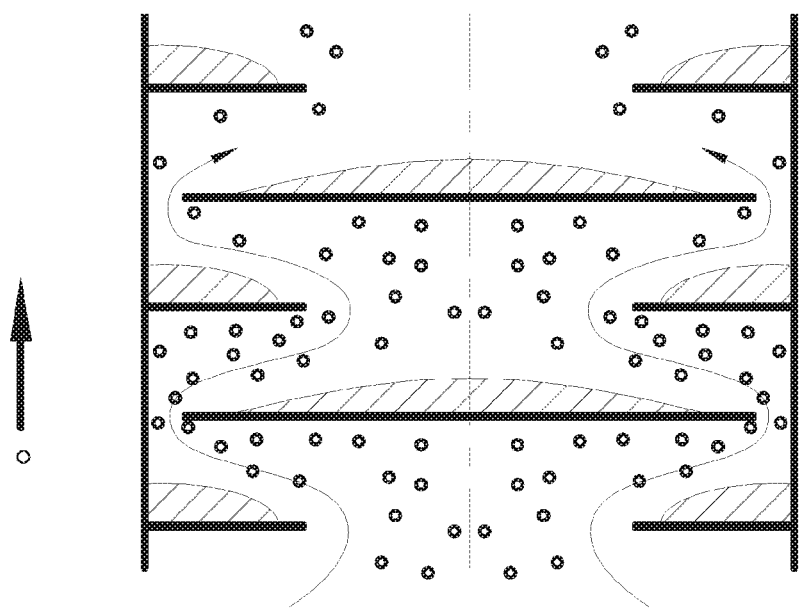
FIG. 2B is a schematic cross-sectional view of the column of 2A showing simulated flow and non-agitated zones when the light phase is dispersed.

FIG. 2B is a schematic cross-sectional view of the column of 2A showing simulated flow and non-agitated zones when the light phase is dispersed. When the continuous phase is the heavy phase, the light phase is dispersed and light droplets progress up through the column. In this mode, there exist non-agitated zones above the center of the disk plates and above the doughnut plates near the inner surface of the column wall.

According to teachings of the present invention, there are provided improved contacting elements on the contours of the disk and doughnut plates. The enhanced mass transfer is achieved by various mechanisms, including:
  (a) teeth are introduced to the contacting areas of the disk and/or doughnuts to increase the length of the contacting area. The most effective area for mass transfer is the area near the liquid-liquid contacting areas;
  (b) teeth disposed on the contours of the plates enhance the breakage of droplets; and
  (c) additional resistance from the modified contours increases the fraction of the dispersed phase (also known as holdup).

Figure 3:
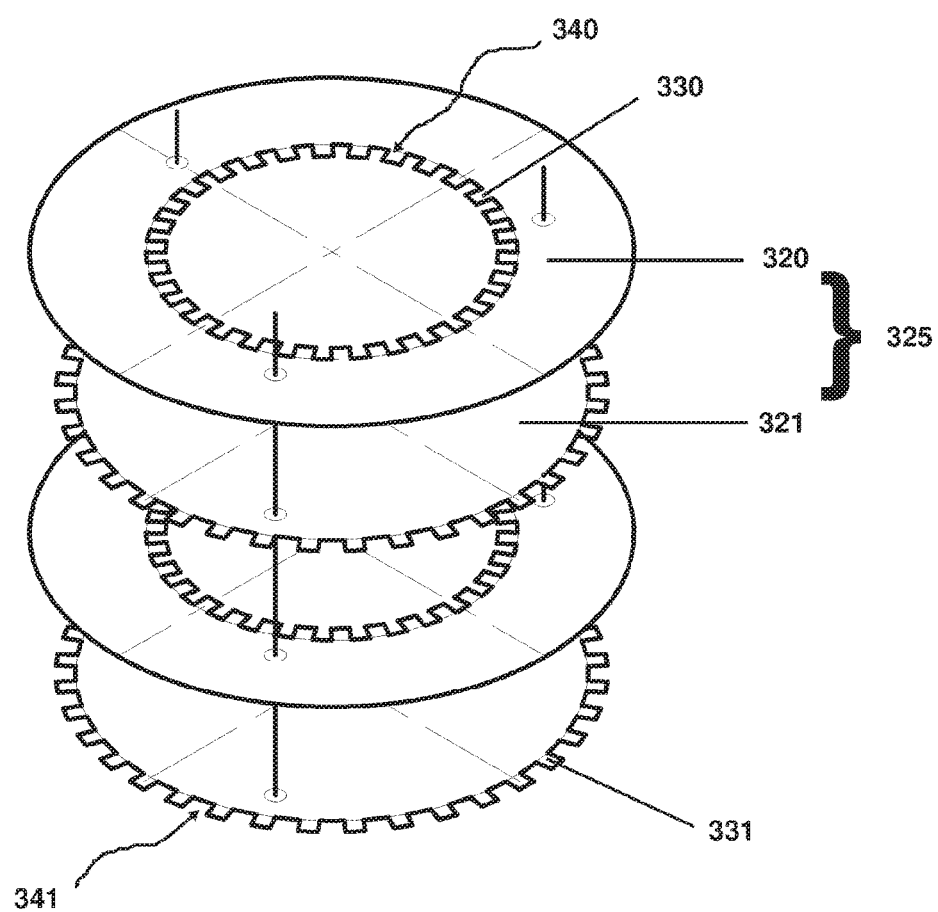
FIG. 3 is a perspective view of a stack of disk and doughnut pairs having increased contact area, according to one embodiment of the present invention.

FIG. 3 is a perspective view of a stack of disk and doughnut pairs having increased contact area, according to one embodiment of the present invention. Each pair 325 of plates includes a disk plate 321 and a doughnut plate 320. A plurality of teeth 331 may be disposed on or near a contacting surface 341 of disk plate 321. Similarly, a plurality of teeth 330 may be disposed on or near a contacting surface 340 of doughnut plate 320.

Teeth 330, 331 may be disposed in a proximate position to contacting surfaces 340, 341, with this proximate position defined by:

$$L_{cs\text{-}doughnut}=(D_{ext}-D_{int})\cdot K,\text{ for doughnut plates; and}$$

$$L_{cs\text{-}disk}=(D_{disk})\cdot K,\text{ for disk plates,}$$

wherein:
$L_{cs\text{-}doughnut}$ is a maximum distance of teeth (length) on each particular doughnut plate, from contacting surface 340 of a particular doughnut plate;

$L_{cs\text{-}disk}$ is a maximum distance of teeth (length) on each particular disk plate, from contacting 341 surface of a particular disk plate;

$D_{ext}$ is an outer diameter of the doughnut plate, excluding any protrusions of the teeth;

$D_{int}$ is an inner diameter of the doughnut plate, excluding any protrusions of the teeth;

$D_{disk}$ is a diameter of the disk plate, excluding any protrusions of the teeth, the teeth having an average length of at least 2 mm; and K is a coefficient; K being at most about 0.05.

In various embodiments, it may be advantageous for K to be at most 0.04, 0.035, 0.03, 0.025, or 0.02.

Figure 4A:
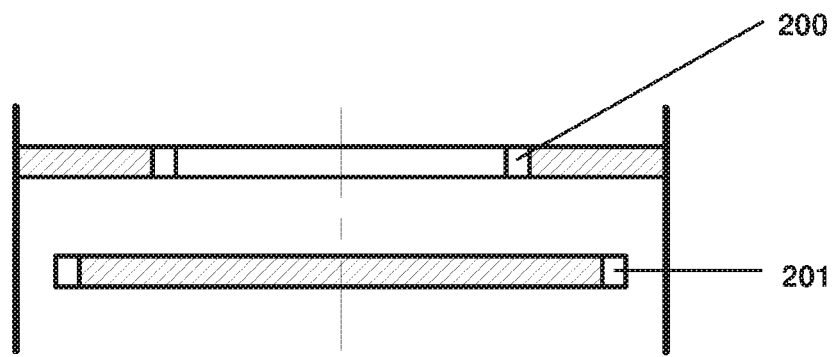
FIG. 4A is a schematic cross-sectional view of an inventive disk and doughnut arrangement such as the arrangement shown in FIG. 3.

FIG. 4A is a schematic cross-sectional view of an inventive disk and doughnut arrangement such as the arrangement shown in FIG. 3. Disk teeth 201 are disposed along the outer perimeter of the disk and doughnut teeth 200 are disposed along the inner perimeter of the doughnut.

Figure 4B:
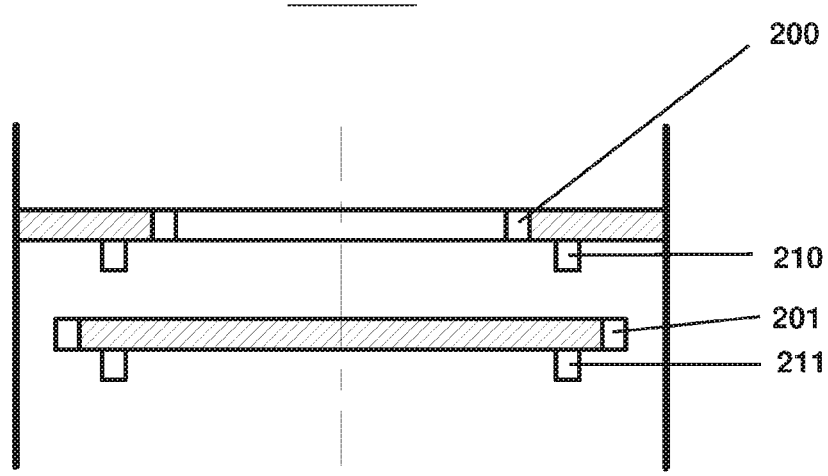
FIG. 4B is a schematic cross-sectional view of an inventive disk and doughnut arrangement, including an additional set of downward projecting teeth.

FIG. 4B is a schematic cross-sectional view of an inventive disk and doughnut arrangement, including an additional set of downward projecting teeth. In addition to the teeth provided in FIG. 4A, disk teeth 211 are disposed in a direction perpendicular to the disk plate, and doughnut teeth 210 are disposed in a direction perpendicular to the doughnut plate. Teeth 210 and 211 are downward pointing teeth, suitable for breaking up light droplets when the heavy phase is the continuous phase. Teeth 210 may be disposed at a maximum distance of $K\cdot(D_{ext}-D_{int})$ from the inner contacting surface (see contacting surface 340 of FIG. 3) of the doughnut plates. Similarly, teeth 211 may be disposed at a maximum distance of $K\cdot(D_{disk})$ from the contacting surface (see contacting surface 341 of FIG. 3) of the disk plates.

Figure 4C:
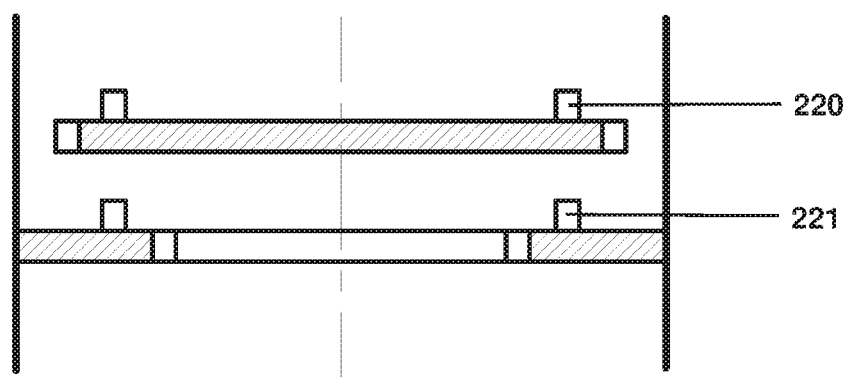
FIG. 4C is a schematic cross-sectional view of an inventive disk and doughnut arrangement, including an additional set of upward projecting teeth.

FIG. 4C is a schematic cross-sectional view of an inventive disk and doughnut arrangement, including an additional set of upward projecting teeth, suitable for breaking up heavy droplets when the light phase is the continuous phase. The disk and doughnut arrangement is essentially a mirror image (taken parallel to the plates) of the arrangement provided in FIG. 4B. The maximum distance of teeth 220 and 221 from the contacting surfaces are identical to those distances for teeth 210 and 211, described hereinabove.

FIGS. 5A through 5F provide top views of the disk and doughnut plates shown in FIGS. 3, 4A, 4B, and 4C, and also provide the prior art counterpart for reference purposes.

FIG. 5A is a top view of a prior art disk. FIG. 5B is a top view of the disk of FIG. 3 or FIG. 4A, having teeth on the perimeter. FIG. 5C is a top view of the disk of FIG. 4C (or a bottom view of the disk of FIG. 4B), having teeth on the perimeter and additional teeth pointing upwards (or downwards) from the plane of disk plate, according to one embodiment of the present invention. While the teeth as shown may be perpendicular to the surface of the plate, the teeth may have an angle of 30° to 90°, 45° to 90° or 60° to 90°, with respect to the plate surface.

FIG. 5D is a top view of a prior art doughnut. FIG. 5E is a top view of the doughnut of FIG. 3 or FIG. 4A, having teeth on its inner circumference, according to one embodiment of the present invention. FIG. 5F is a top view of the doughnut of FIG. 4C (or a bottom view of the doughnut of FIG. 4B), having teeth on its inner circumference and additional teeth pointing upwards (or downwards), according to one embodiment of the present invention. While the teeth as shown may be perpendicular to the surface of the plate, the teeth may have an angle of 30° to 90°, 45° to 90° or 60° to 90°, with respect to the plate surface.

FIGS. 6A through 6F show the length ratios of various perimeter configurations. A length ratio (LR) may be defined as the ratio of a perimeter of teeth to the base perimeter, excluding teeth. A base perimeter of the contacting surface of a disk plate is the perimeter of the largest regular convex shape within the planar section of the disk plate. A doughnut plate may have both inner and outer base perimeters. The inner base perimeter of the contacting surface of a doughnut plate is the perimeter of the smallest regular convex shape within the planar section of the doughnut plate. The outer base perimeter of the contacting surface of a doughnut plate is the perimeter of the largest regular convex shape within the planar section of the doughnut plate.

Figure 6A:
FIG. 6A is a schematic drawing of a prior art disk edge, having no teeth.
Figure 6B:
FIG. 6B is a schematic drawing of disk edge having a sawtooth pattern, according to one embodiment of the present invention.
Figure 6C:
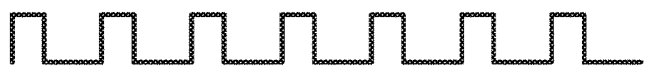
FIG. 6C is a schematic drawing of disk edge having a widely spaced square tooth pattern, according to one embodiment of the present invention.
Figure 6D:
FIGS. 6D and 6E are schematic drawings of disk edges having closely spaced square tooth patterns, according to embodiments of the present invention.
Figure 6E:
Figure 6F:
FIG. 6F is a schematic drawing of disk edge having a closely spaced rounded tooth pattern, according to one embodiment of the present invention.

FIG. 6A is a schematic drawing of a prior art disk edge, with no teeth, having a length ratio of 1.0. FIG. 6B is a schematic drawing of a disk edge having a sawtooth pattern, having a length ratio of 1.3. FIG. 6C is a schematic drawing of an inventive disk edge having a widely spaced square tooth pattern, and having a length ratio of 2.0. FIG. 6D is a schematic drawing of an inventive disk edge having a widely spaced square tooth pattern, and having a length ratio of 2.5. FIG. 6E is a schematic drawing of an inventive disk edge having a closely spaced square tooth pattern, and having a length ratio of 3.0. FIG. 6F is a schematic drawing of an inventive disk edge having a closely spaced, rounded tooth pattern, and having a length ratio of 3.0.

The inventors have found, inter alia on the basis of visual observations, that hold-up may be improved and non-agitated areas may be appreciably decreased at length ratios of at least 2.0, at least 2.2, at least 2.4, at least 2.6, at least 2.8, at least 3.0, at least 3.5, at least 4.0, at least 4.5, or at least 5.0. Typically, the length ratios are within a range of 2.0-6.0, 2.4-5.0, 2.4-4.0, or 2.6-3.5.

Figure 7A:
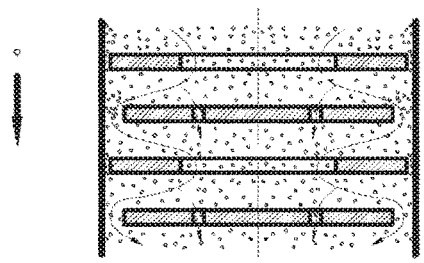
FIG. 7A is a schematic cross-sectional view of an inventive disk and doughnut arrangement, constructed from the disk of FIG. 7B and the doughnut of FIG. 7C, showing simulated flow and reduced non-agitated zones for a continuous light phase, according to one embodiment of the present invention.
Figure 7B:
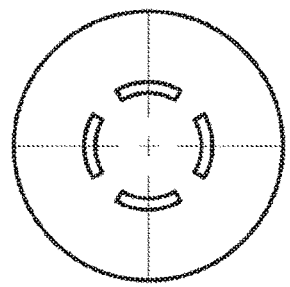
FIG. 7B is a schematic top view of a disk having annular apertures, according to one embodiment of the present invention.
Figure 7C:
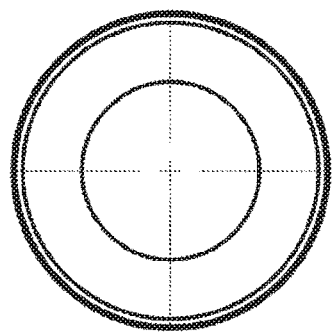
FIG. 7C is a schematic top view of a doughnut within a column, the doughnut sized to provide a gap between the doughnut's outer edge and the column wall, according to one embodiment of the present invention.

FIG. 7A is a schematic cross-sectional view of an inventive disk and doughnut arrangement, constructed from the disk of FIG. 7B and the doughnut of FIG. 7C, and showing simulated flow and reduced non-agitated zones for an exemplary continuous light phase. Some of the flow passes through a gap between the outer perimeter of the doughnut and the inside wall of the column, thereby preventing the formation of stagnant zones, or reducing the size thereof, in the peripheral corners underneath the doughnut plates (compare with FIG. 2A). Similarly, some of the flow passes through apertures in the body of the disk plate, thereby preventing the formation of stagnant zones, or reducing the size thereof, in the central region underneath the disk plates (compare with FIG. 2A).

One design principle in the classical design of disk and doughnut stacks is to minimize shortcutting or bypassing phenomena. To this end, the clearance between the doughnut plates and the shell (wall) approaches zero, on average, and disk plates are fabricated without holes or apertures. The inventors have discovered, however, that gaps and/or aperture(s) of 1% to 5% of the total disk plate area may appreciably reduce the non-agitated volume, while the negative ramifications of the bypassing of disks or doughnuts is relatively insignificant.

FIG. 7B is a schematic top view of a disk having annular apertures, according to one embodiment of the present invention. The shape of the apertures is annular, but one of ordinary skill in the art will appreciate that various shapes may be efficacious. The apertures are preferably disposed within the inner 50 area % of the disk. Preferably, the total area of the one or more apertures is up to 5% of the cross-sectional area of the disk. Typically, the total area of the one or more apertures is within a range of 1-5%, 1.5-5%, 2-5%, or 2-4% of the cross-sectional area of the disk.

FIG. 7C is a schematic top view of a doughnut within a column, the doughnut sized to provide a gap between the doughnut's outer edge and the column wall, according to one embodiment of the present invention. The gap or average gap may be less than 40 mm, less than 30 mm, less than 25 mm, less than 20 mm, less than 15 mm, less than 10 mm, less than 8 mm, less than 6 mm, less than 5 mm, less than 4 mm, or less than 3.5 mm, on average. The gap may be at least 2 mm or at least 2.5 mm, on average.

Figure 7D:
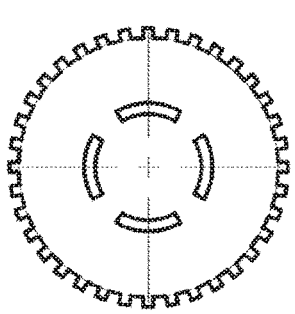
FIG. 7D is a schematic top view of a disk having teeth on the perimeter and annular apertures, according to one embodiment of the present invention.

FIG. 7D is a schematic top view of a disk having teeth on the perimeter and annular apertures, according to one embodiment of the present invention.

Figure 7E:
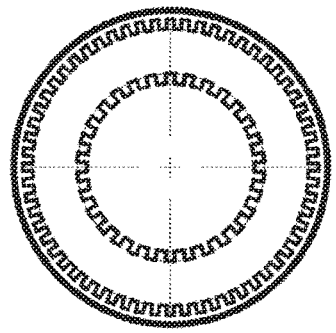
FIG. 7E is a schematic top view of a doughnut having teeth on both inner and outer circumferences, fitted within a column, according to one embodiment of the present invention.

FIG. 7E is a schematic top view of a doughnut having teeth on both inner and outer circumferences. The doughnut is fitted within a column. Both the teeth on the outer perimeter of the doughnut, and the gap between the outer perimeter and the inside surface (or wall) of the column, reduce the size of non-agitated zones in the area proximate to the column wall.

Figure 7F:
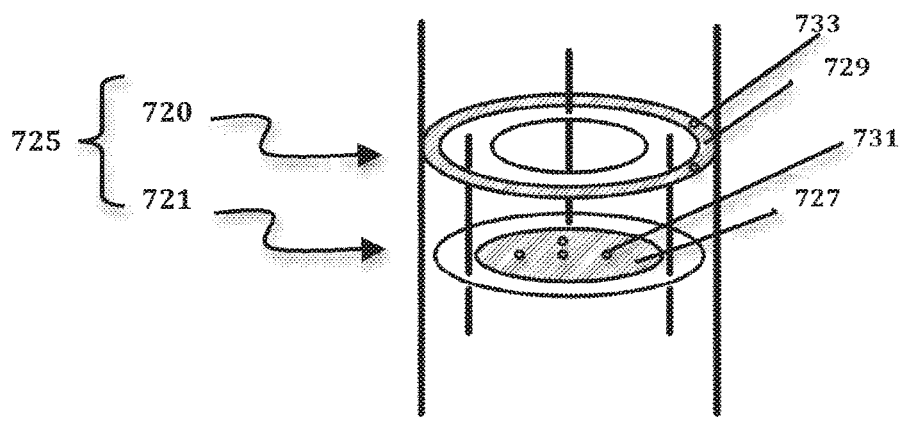
FIG. 7F is a schematic perspective view of an inventive disk and doughnut pair, in which an innermost area of the disk and an outermost area of the doughnut have at least one aperture.

FIG. 7F is a schematic perspective view of an inventive disk and doughnut pair 725, in which an innermost or central (circular) area 727 of disk or disk plate 721 may have at least one disk aperture 731 and an outermost or external (annular) area 729 of doughnut or doughnut plate 720 may have at least one doughnut aperture 733.

As shown in exemplary fashion in FIG. 7F, the aperture area in disk plate 721 is of a non-uniform radial distribution, such that innermost area 727 contains a disproportionately high area fraction of disk apertures 731. Innermost area 727, which may be at most 50 area %, at most 40 area %, at most 30 area %, at most 25 area %, at most 20 area %, at most 15 area %, at most 12 area %, or at most 10 area % of the disk plate, may contain at least 60 area %, at least 65 area %, at least 70 area %, at least 75 area %, at least 80 area %, at least 85 area %, at least 90 area %, or at least 95 area % of disk apertures 731.

As shown in exemplary fashion in FIG. 7F, the aperture area in doughnut plate 720 is of a non-uniform radial distribution, such that outermost area 729 of doughnut plate 720 contains a disproportionately high area fraction of doughnut apertures 733. Outermost area 729, which may be at most 50 area %, at most 40 area %, at most 30 area %, at most 25 area %, at most 20 area %, or at most 15 area % of the doughnut plate, may contain at least 60 area %, at least 65 area %, at least 70 area %, at least 75 area %, at least 80 area %, at least 85 area %, at least 90 area %, or at least 95 area % of doughnut apertures 733.

In some embodiments, at least 20 area %, at least 40 area %, at least 60 area %, at least 80 area %, or at least 95 area % of the doughnut apertures is disposed radially outside of the disk apertures. According to still further features in the described preferred embodiments, at least 10 area %, at least 20 area %, at least 40 area %, at least 60 area %, at least 80 area %, or at least 95 area % of the doughnut apertures is disposed radially outside of the disk plate. In the exemplary embodiment provided in FIG. 7F, all of doughnut apertures 733 are disposed radially outside of disk apertures 731, and radially outside of disk plate 721.

In some embodiments, at least 40 area %, at least 60 area %, at least 70 area %, at least 80 area %, at least 90 area %, or at least 95 area % of the doughnut aperture or apertures is radially disaligned with respect to the aperture area of the disk plate. In the exemplary embodiment provided in FIG. 7F, the disalignment is 100%.

In some embodiments, at least 10 area %, at least 20 area %, at least 40 area %, at least 60 area %, at least 80 area %, or at least 95 area % of doughnut apertures 733 is disposed in a radially outward fashion with respect to disk plate 721.

In the exemplary embodiment provided in FIG. 7F, 100 area % of doughnut apertures 733 is disposed in a radially outward fashion with respect to disk plate 721.

EXAMPLES

Reference is now made to the following examples, which together with the above description, illustrate the invention in a non-limiting fashion.

Figure 8A:
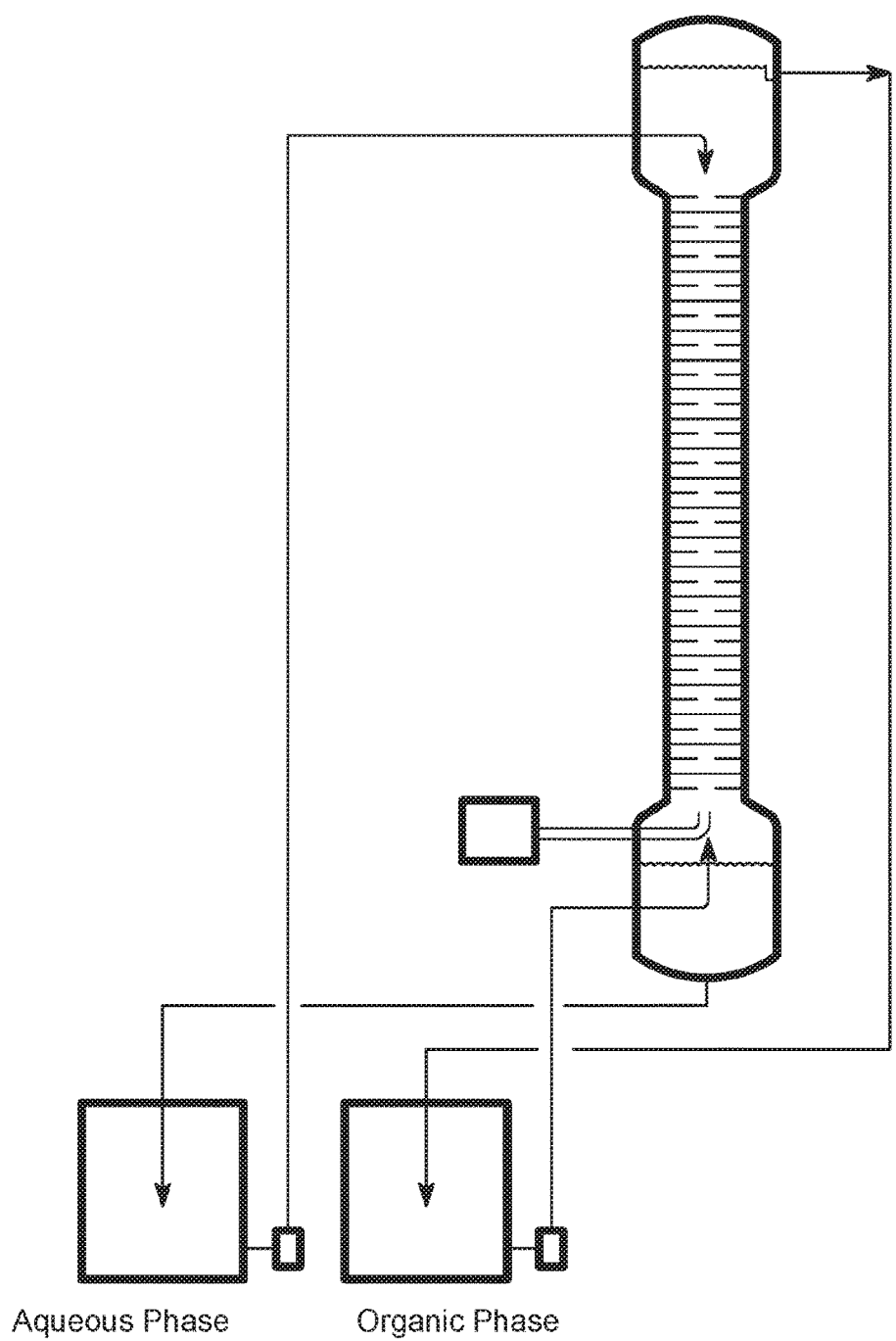
FIG. 8A is a simplified schematic cross-sectional view of a pulsed disk and doughnut column used in the experiment of Examples 1 and 3 to 5.

FIG. 8A is a simplified schematic cross-sectional view of a pulsed disk and doughnut column system used in the experiment of Examples 1, 3 and 4.

Example 1

Apparatus Description

In a pilot facility, the pulsed column had an active section height of 3 m and an internal diameter of 100 mm containing PVDF disk and doughnut pairs having a spacing of 23.7 mm. The upper decanter had an inner diameter of 150, and the lower decanter had an inner diameter of 100 mm. The column was pulsed periodically by a mechanical pulsation mechanism including a positive displacement arrangement of a Teflon piston within a cylinder having a diameter of 120 mm. The length of the stroke was manually controlled by a wheel, providing a displacement length within a range of 0-30 mm. The frequency of the stroke was held constant at 60 strokes per minute.

FIG. 8A is a simplified schematic cross-sectional view of a pulsed disk and doughnut column used in the experiment of Example 1.

Two types of packing were tested in order to examine the influence of the teeth internals:

(1) Standard Internals

The disks had a diameter of 87 mm and the doughnut apertures were 49 mm, yielding open (free) areas of 24% for both disk plates and doughnut plates.

(2) Modified Internals

The open (free) areas and the spacing between the internals were maintained as in the standard internals.

The general configuration of the disk and doughnut plates was according to FIGS. 5B and 5E. The contour shape was rectangular as provided in FIG. 6C, with a length ratio of 2.0. The amplitude (length) of each tooth was 3 mm.

Liquid-Liquid System

Organic phase: Kerosene (ShellSolg D70) as the continuous phase.

Aqueous phase: 10 g/L $H_2SO_4$ as the dispersed phase.

Hydraulic test: no mass transfer.

Phase ratio O: A [v/v]=1:1.

Results

The maximum flux was determined to be about 50 m3/m2/h, for both types of internals.

The holdup was increased by 10-70%. Holdup results at flux 30 and 40 m3/m2/h, respectively, are shown in Table 1.

TABLE 1

| Pulsator amplitude | mm | | 0 | 4 | 8 | 12 | 16 | 20 |
|---|---|---|---|---|---|---|---|---|
| Holdup at Flux 30 m3/m2/h | [v/v] % | Standard internals | 30 | 23 | 11 | 12 | 10 | 10 |
| | | Modified internals | 28 | 25 | 16 | 14 | 17 | 24 |

TABLE 1-continued

| Pulsator amplitude | mm | | 0 | 4 | 8 | 12 | 16 | 20 |
|---|---|---|---|---|---|---|---|---|
| Holdup at Flux 40 m3/m2/h | [v/v] % | Standard internals | flooding | 23 | 17 | 20 | 21 | 20 |
| | | Modified internals | flooding | 30 | 20 | 23 | 26 | flooding |

The quality of dispersion (based on visual observation and characterization) was improved significantly using the inventive internals: the droplet size decreased, and the size of the dead zones below the disk and doughnut plates was appreciably reduced.

Example 2

Apparatus Description

Figure 8B:
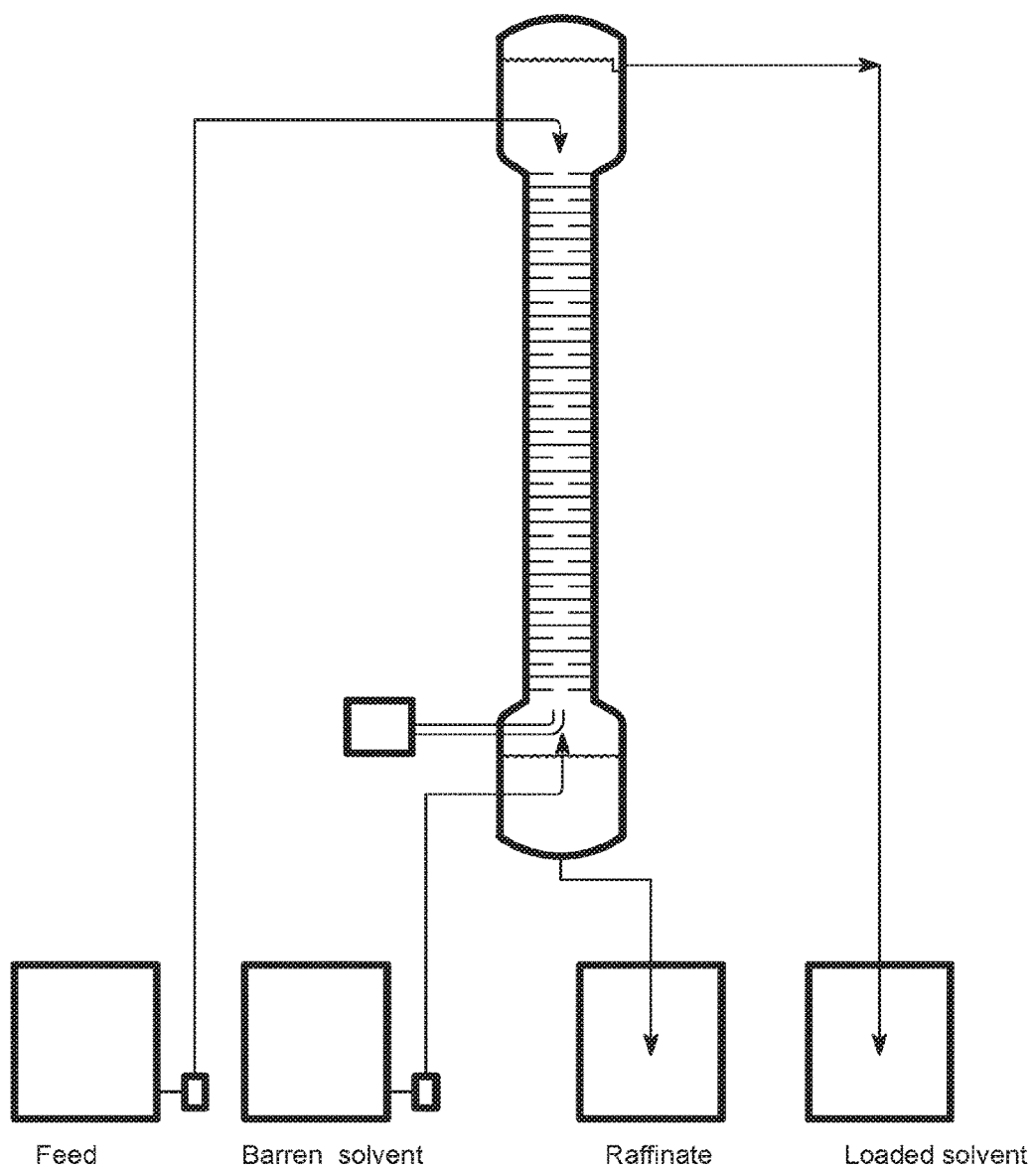
FIG. 8B is a simplified schematic cross-sectional view of a pulsed disk and doughnut column used in the experiment of Example 2.

FIG. 8B is a simplified schematic cross-sectional view of a pulsed disk and doughnut column system used in the experiment of Example 2. The column was identical to that described with respect to Example 1.

The barren organic mixture was pumped into the bottom of the column. The loaded organic ("upper") effluent overflowed from the upper decanter. The aqueous phase was pumped to the top of the active section.

(1) Standard Internals

As described in Example 1.

(2) Modified Internals

The open (free) areas and the spacing between the internals were maintained as in the standard internals.

The general configuration of the disk and doughnut plates was according to FIGS. 5C and 5F. The contour shape was rectangular as provided in FIG. 6D, with a length ratio of 3.0. The amplitude (length) of each tooth was 3 mm.

Liquid-Liquid System

Organic phase: 10% [v/v] DEHPA in Kerosene (ShellSol® D70) as the dispersed phase.

Aqueous phase: 55 g/L Zn solution (based on $ZnSO_4$).

Mass transfer test: Zn transferring from the aqueous phase to DEHPA.

Phase ratio O: A [v/v]=10:1.

The tests were performed at a constant flux of 20 m3/m2/h, and at a constant amplitude of 8 mm.

Significant improvement was achieved using the inventive internals arrangement, as shown in Table 2 (concentrations expressed in g Zn/L):

TABLE 2

| | Aqueous in [g/L] | Aqueous out [g/L] | Barren Organic [g/L] | Loaded Organic [g/L] | NTU[1] [#] | HTU[2] [m] |
|---|---|---|---|---|---|---|
| Standard internals | 52.5 | 36.3 | 0.1 | 1.8 | 1.7 | 1.8 |
| Modified internals | 52.5 | 32.0 | 0.1 | 2.2 | 2.8 | 1.1 |

[1] NTU = number of theoretical units
[2] HTU = height of theoretical unit

Example 3

Apparatus Description

The pulsed column system and general apparatus and method used in Example 3 are described in Example 1 (see also FIG. 8A).

(1) Standard Internals

As described in Example 1.

(2) Modified Internals

The open (free) areas and the spacing between the internals were maintained as in the standard internals.

The contour of the modified internals was substantially as shown in FIG. 6D. The amplitude of each tooth was 3 mm and the length ratio was 3.0.

Liquid-Liquid System

Organic phase: Kerosene (ShellSol® D70) as the dispersed phase.

Aqueous phase: 10 g/L $H_2SO_4$ as the continuous phase.

Hydraulic test: no mass transfer.

Phase ratio O: A [v/v]=1:1.

Results

The maximum flux was found to be approximately 55 m3/m2/h. The results using the standard internals and the inventive internals are provided in Table 3. Using the inventive internals, the quality of dispersion was improved, as shown schematically in FIG. 7A.

TABLE 3

| Pulsator amplitude | mm | | 0 | 4 | 8 | 12 | 16 | 20 |
|---|---|---|---|---|---|---|---|---|
| Holdup at Flux 30 m3/m2/h | [v/v] % | Standard internals | 8 | 4 | 4 | 4 | 9 | 17 |
| | | Modified internals | 10 | 5 | 4 | 7 | 11 | 18 |
| Holdup at Flux 40 m3/m2/h | [v/v] % | Standard internals | flooding | 14 | 9 | 9 | 13 | 23 |
| | | Modified internals | flooding | 15 | 10 | 11 | 18 | 29 |

Example 4

Apparatus Description

The pulsed column system and general apparatus and method used in Example 4 are described in Example 1.

(1) Standard Internals

As described in Example 1.

(2) Modified Internals (see FIGS. 7B and 7C)

The open (free) areas and the spacing between the internals were maintained as in the standard internals. The outer spacing between the doughnut and the column shell had an area equivalent to (a) 0.5%; (b) 1.5%; and (c) 4% of the total cross-sectional area of the column shell.

Liquid-Liquid System

Organic phase: Methyl Isobutyl Ketone (MIBK) as the continuous phase.

Aqueous phase: deionized water as the dispersed phase.

Hydraulic test: no mass transfer.

Phase ratio O: A [v/v]=4:1.

Visual Observations

With respect to the standard internals, the turbulence below the disk and doughnuts plates was not improved for (a). In (b), some improvement and reductions of the "dead volumes" were observed. In (c), reductions of the "dead volumes" were observed. However, for much larger outer spacings, significant short-circuiting via the outer spacing was observed.

Example 5

Apparatus Description

The pulsed disk and doughnut column system used was identical to the system used in the experiment of Example 2. The column was identical to that described with respect to Example 1.

This example refers to the purification step in the solvent extraction section in purified phosphoric acid production. The loaded organic mixture was pumped into the bottom of the column. The purified organic ("upper") effluent overflowed from the upper decanter. The aqueous phase was pumped to the top of the active section.

(1) Standard Internals

As described in Example 1.

(2) Modified Internals

The open (free) areas and the spacing between the internals were maintained as in the standard internals.

The general configuration of the disk and doughnut plates was according to FIGS. 4C, 5C and 5F. The contour shape was rectangular as provided in FIG. 6D, with a length ratio of 3.0. The amplitude (length) of each tooth was 3 mm.

Liquid-Liquid System

Organic phase: MIBK (methyl isobutyl ketone) containing 125 mg/kg Fe as the continuous phase.

Aqueous phase: purified phosphoric acid containing ~10 mg/kg Fe.

Mass transfer test: Fe transferring from MIBK to aqueous phase.

Phase ratio O: A [v/v]=10:1–12:1.

The tests were performed at a constant flux of about 20 m3/m2/h.

Significant improvement was achieved using the inventive internals arrangement, as shown in Table 4 (concentrations expressed in mg Fe/kg solution):

TABLE 4

| | Aqueous in | Aqueous out | Loaded Organic | Purified Organic | NTU[1] [#] | HTU[2] [m] |
|---|---|---|---|---|---|---|
| Standard internals | 13 | 1600 | 125 | 4 | 3 | 0.42 |
| Modified internals | 6 | 2100 | 125 | <1 | 4.5 | 0.65 |

[1]NTU = number of theoretical units
[2]HTU = height of theoretical unit

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including U.S. Pat. No.

2,601,674 to Reman et al., U.S. Pat. No. 4,200,522 to Karr, and U.S. Pat. No. 2,011,186 to Van Dijk are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A liquid-liquid contacting arrangement, adapted to be installed within a liquid-liquid extraction column, the contacting arrangement comprising:
    (a) a plurality of pairs of disk and doughnut plates, said pairs stacked in a generally longitudinal stack, said stack being generally perpendicular to broad faces of said disk and doughnut plates,
    each pair of said disk and doughnut pairs including:
        (i) a disk plate; and
        (ii) a doughnut plate, disposed beneath said disk plate;
    said disk plate having a first liquid-liquid contacting surface along an external perimeter of said disk plate;
    said doughnut plate having a second liquid-liquid contacting surface along an internal perimeter of said doughnut plate; and
    (b) a securing arrangement adapted to
        (i) affix said disk plate and said doughnut plate of said each pair in a first spaced-apart relationship; and
        (ii) affix, in a second spaced-apart relationship, said disk and doughnut pairs with respect to one another;
    at least a portion of at least one of said first and second contacting surfaces having teeth disposed in a proximate position to said first and second contacting surfaces,
    said proximate position defined by:

$$L_{cs\text{-}doughnut} = K \cdot (D_{ext} - D_{int}), \text{ for said doughnut plates; and}$$

$$L_{cs\text{-}disk} = K \cdot (D_{disk}), \text{ for said disk plates,}$$

wherein:
$L_{cs\text{-}doughnut}$ is a maximum distance of said teeth on each particular doughnut plate, from said contacting surface of said particular doughnut plate;
$L_{cs\text{-}disk}$ is a maximum distance of said teeth on each particular disk plate, from said contacting surface of said particular disk plate;
$D_{ext}$ is an outer diameter of said doughnut plate, excluding any protrusions of said teeth;
$D_{int}$ is an inner diameter of said doughnut plate, excluding any protrusions of said teeth;
$D_{disk}$ is a diameter of said disk plate, excluding any protrusions of said teeth;
said teeth having an average length of at least 2 mm;
K is a coefficient, K being at most 0.05;
and wherein a length ratio of said external perimeter, including said teeth, to a base perimeter of said disk, excluding said teeth, or of said internal perimeter, including said teeth, to a base perimeter of said doughnut, excluding said teeth, is at least 2.0.

2. The contacting arrangement of claim 1, said length ratio being at least 2.6.

3. The contacting arrangement of claim 1, said teeth being disposed on at least one of said disk plates.

4. The contacting arrangement of claim 1, said teeth including teeth disposed on both said contacting surface of said doughnut plate and said contacting surface of said disk plate.

5. The contacting arrangement of claim 1, said teeth including teeth disposed on at least one of a top surface of said doughnut plate and a top surface of said disk plate, and pointing upwards.

6. The contacting arrangement of claim 1, said teeth including teeth disposed on at least one of a bottom surface of said doughnut plate and a bottom surface of said disk plate, and pointing downwards.

7. The contacting arrangement of claim 1, a first disk plate and a first doughnut plate of a particular pair of said being longitudinally separated by a distance $L_{pair}$, at least a portion of said teeth having a length of at least $0.03 \cdot L_{pair}$.

8. The contacting arrangement of claim 7, said average length of said teeth being at least $0.03 \cdot L_{pair}$.

9. The contacting arrangement of claim 1, said average length being at least 3 mm.

10. The contacting arrangement of claim 1, said average length being at least $0.025 \cdot D_{ext}$.

11. The contacting arrangement of claim 10, said average length being at most $0.08 \cdot D_{ext}$.

12. The contacting arrangement of claim 1, a spacing between said teeth being at least 3 mm.

13. The contacting arrangement of claim 1, further comprising said column.

14. The contacting arrangement of claim 13, further comprising a pulsation mechanism, said pulsation mechanism fluidly communicating with an internal volume of said column.

15. The contacting arrangement of claim 13, at least a particular doughnut plate of said doughnut plates further comprising teeth disposed radially outward with respect to $D_{ext}$, between said particular doughnut plate and an internal surface of said column.

16. The contacting arrangement of claim 13, an outer spacing between a particular doughnut plate of said doughnut plates and an inner surface of said column having an area $A_{spacing}$, an inner contacting area of said particular doughnut plate being defined by $\pi \cdot (D_{ext})^2/4$, and an area ratio of said $A_{spacing}$ to said inner contacting area being within a range of 1-5%.

17. The contacting arrangement of claim 1, said disk and doughnut pair having at least one of: at least one disk aperture passing through said disk plate, and at least one doughnut aperture passing through said doughnut plate, an aperture area of said disk aperture being of a non-uniform radial distribution along said disk plate, such that an innermost area of said disk plate contains at least 60 area % of said at least one disk aperture, said innermost area being at most 50 area % of said disk plate.

18. A liquid-liquid contacting arrangement comprising:
    (a) a plurality of pairs of disk and doughnut plates, said pairs stacked in a generally longitudinal stack, said stack being generally perpendicular to broad faces of said disk and doughnut plates,
    each pair of said disk and doughnut pairs including:
        (i) a disk plate; and
        (ii) a doughnut plate, disposed beneath said disk plate;
    said doughnut plate having a second liquid-liquid contacting surface along an internal perimeter of said doughnut plate; and
    (b) a securing arrangement adapted to
        (i) affix said disk plate and said doughnut plate of said each pair in a first spaced-apart relationship; and
        (ii) affix, in a second spaced-apart relationship, said disk and doughnut pairs with respect to one another;

at least a portion of said second contacting surface having teeth disposed in a proximate position to said second contacting surface, said proximate position defined by:

$L_{cs\text{-}doughnut}=K\cdot(D_{ext}-D_{int})$, for said doughnut plates;
and wherein:

$L_{cs\text{-}doughnut}$ is a maximum distance of said teeth on each particular doughnut plate, from said contacting surface of said particular doughnut plate;

$D_{ext}$ is an outer diameter of said doughnut plate, excluding any protrusions of said teeth;

$D_{int}$ is an inner diameter of said doughnut plate, excluding any protrusions of said teeth;

said teeth having an average length of at least 2 mm;

K is a coefficient, K being at most 0.05;

and wherein a length ratio of said internal perimeter including said teeth to a base perimeter of said doughnut, excluding said teeth, is at least 2.0.

19. The contacting arrangement of claim 18, further comprising said column and a pulsation mechanism, said pulsation mechanism fluidly communicating with an internal volume of said column.

20. A liquid-liquid contacting arrangement comprising:
(a) a plurality of pairs of disk and doughnut plates, said pairs stacked in a generally longitudinal stack, said stack being generally perpendicular to top and bottom broad faces of said disk and doughnut plates,
each pair of said disk and doughnut pairs including:
(i) a disk plate; and
(ii) a doughnut plate, disposed beneath said disk plate;
said disk plate having a first liquid-liquid contacting surface along an external perimeter of said disk plate;
said doughnut plate having a second liquid-liquid contacting surface along an internal perimeter of said doughnut plate;
(b) a securing arrangement adapted to
(i) affix said disk plate and said doughnut plate of said each pair in a first spaced-apart relationship; and
(ii) affix, in a second spaced-apart relationship, said disk and doughnut pairs with respect to one another;
(c) a column housing said longitudinal stack and said securing arrangement; and
(d) a pulsation mechanism, fluidly communicating with an internal volume of said column;

wherein at least a portion of at least one of said first and second contacting surfaces have teeth disposed in a proximate position to said first and second contacting surfaces, said proximate position defined by:

$L_{cs\text{-}doughnut}=K\cdot(D_{ext}-D_{int})$, for said doughnut plates;
and $L_{cs\text{-}disk}=K\cdot(D_{disk})$, for said disk plates, wherein:

$L_{cs\text{-}doughnut}$ is a maximum distance of said teeth on each particular doughnut plate, from said contacting surface of said particular doughnut plate;

$L_{cs\text{-}disk}$ is a maximum distance of said teeth on each particular disk plate, from said contacting surface of said particular disk plate;

$D_{ext}$ is an outer diameter of said doughnut plate, excluding any protrusions of said teeth;

$D_{int}$ is an inner diameter of said doughnut plate, excluding any protrusions of said teeth;

$D_{disk}$ is a diameter of said disk plate, excluding any protrusions of said teeth;

said teeth having an average length of at least 2 mm;

K is a coefficient, K being at most 0.05;

wherein a length ratio of said external perimeter including said teeth to a base perimeter of said disk, excluding said teeth, or of said internal perimeter including said teeth to a base perimeter of said doughnut, excluding said teeth, is at least 2.0;

said teeth including teeth disposed on at least one of:
said top broad face of said doughnut plate and said top broad face of said disk plate, and pointing upwards; and
said bottom broad face of said doughnut plate and said bottom broad face of said disk plate, and pointing downwards.

* * * * *